United States Patent [19]

Bowden

[11] 4,224,926
[45] Sep. 30, 1980

[54] IN-LINE MANIFOLD SOLAR HEAT COLLECTORS

[75] Inventor: Donald R. Bowden, Huntsville, Ala.

[73] Assignee: Solar Unlimited, Inc., Huntsville, Ala.

[21] Appl. No.: 942,843

[22] Filed: Sep. 15, 1978

[51] Int. Cl.³ .............................................. F24J 3/02
[52] U.S. Cl. ................................... 126/448; 126/442; 126/450; 126/446; 165/176
[58] Field of Search .............. 126/270, 271, 450, 442, 126/448, 446, 447; 237/1 A; 165/48 S, 173, 175, 176

[56] References Cited

U.S. PATENT DOCUMENTS

| | | | |
|---|---|---|---|
| 1,473,018 | 11/1923 | Danner | 126/271 |
| 1,622,703 | 3/1927 | Campbell | 126/176 X |
| 2,274,492 | 2/1942 | Modine | 126/271 |
| 2,907,318 | 10/1959 | Awot | 126/271 |
| 3,145,707 | 8/1964 | Thomason | 126/271 |
| 3,262,497 | 7/1966 | Worthen et al. | 165/176 |
| 3,985,117 | 10/1976 | Sallen | 126/271 |
| 4,033,327 | 7/1977 | Pei | 126/271 |
| 4,036,208 | 7/1977 | Bauer | 126/271 |
| 4,076,026 | 2/1978 | Copping | 126/448 |
| 4,105,042 | 8/1978 | Johnston, Jr. | 126/448 X |
| 4,112,921 | 9/1978 | Mac Cracken | 126/271 |
| 4,120,287 | 10/1978 | Marles et al. | 126/271 |
| 4,133,298 | 1/1979 | Hayama | 126/271 |
| 4,155,346 | 5/1979 | Aresty | 126/271 |

Primary Examiner—James C. Yeung
Assistant Examiner—Larry Jones
Attorney, Agent, or Firm—Dowell & Dowell

[57] ABSTRACT

Solar heat collector apparatus wherein each solar collector unit comprises a modular collector box having multiple collector tubes with their respective inlet and out ends grouped together and connected to an inlet manifold pipe and an outlet manifold pipe, the manifold pipes being outside the box and axially aligned with their bores non-communicating, several collector boxes being placed together side-by-side with their aligned manifolds interconnected, and the boxes having covers which completely enclose the manifold pipes and have no connections to external fluid circuitry exposed.

4 Claims, 3 Drawing Figures

IN-LINE MANIFOLD SOLAR HEAT COLLECTORS

FIELD OF INVENTION

This invention relates to solar heat collector modular units and more particularly to solar collector units especially designed for side-by-side mounting wherein the units are provided with inlet and outlet manifold pipes aligned for mutual interconnection and further provided with covers for concealing, protecting, and insulating the manifold pipes and their interconnecting nipples and elbows.

BACKGROUND AND PRIOR ART

For the sake of economy of manufacture, solar collector units are made in modular form, and are then assembled and interconnected in the number required to achieve a given purpose. It is generally well known to build solar collector units with a view toward achieving easy and orderly assembly thereof.

U.S. Pat. Nos. 1,473,018 to Danner, 2,274,492 to Modine and 3,145,707 to Thomason show the concept of placing multiple collector units side-by-side and connecting them transversely in series. However, these interconnections are exposed to the atmosphere and unprotected against corrosion and/or heat losses, and are also relatively unsightly.

U.S. Pat. Nos. 2,907,318 to Awot and 4,036,208 to Bauer both show in FIG. 1 inlet and outlet connection pipes which open in opposite directions and have their bores mutually aligned, but they are so disposed relative to the collector boxes themselves that it would not be possible to place the boxes in immediately adjacent mutual orientation, but instead series-connected boxes would have to be spaced apart.

U.S. Pat. No. 3,262,497 to Worthen et al shows U-shaped tubing connected between inlet and outlet manifold pipes which are mutually aligned, but not in combination with collector box structure provided with covers especially adapted to conceal, protect and insulate the manifolds and their connections while at the same time facilitating their installation and interconnection.

THE INVENTION

This disclosure includes in a solar collector unit features of ordinary design comprising finned tubes located inside of a collector box with single or double glazing over the tubes and with suitable insulation in the box, The disclosure adds to this well known structure the concept of bringing the tubes out through one end of the box and attaching them to an external pair of manifold pipes arranged with their bores in mutual alignment, the manifold pipes being mutually non-communicating near their adjacent ends. These manifold pipes include an inlet manifold pipe connected to all of the inlet ends of all of the tubes, and an outlet manifold pipe connected to all of the outlet ends of the tubes. The manifold pipes have opposed connecting ends which are stopped short of the planes of the sidewalls of the box so that adjacent boxes can be placed in mutually touching orientation. In addition, the invention adds the concept of a composite manifold cover comprising a group of separable cover members shaped to cover said one end of the box and to enclose and conceal the manifold pipes, the cover having top and bottom members which mate with each other and having special end members adapted to pass in a substantially airtight manner external fluid circuitry pipes which are connected to the manifold pipes.

It is a principle object of this invention to provide improved inlet and outlet manifold means for solar collector units so arranged that the units can be placed immediately side-by-side with respect to each other, the connections to the units and between adjacent units being made through cover members which completely conceal and protect the connections for the purpose of preventing deterioration thereof by corrosion, loss of heat into the atmosphere, or mechanical damage thereto, while at the same time providing a neat finished appearance in which the pipe connections to the collector units are not visible.

It is another object of the invention to provide covers for covering the connections to the solar units, which covers are conveniently and easily installed after the solar units are in place and connected into the remainder of the fluid circuitry.

Another object of the invention is to provide a system of cover members which are completely separable from the solar connector box units thereby providing maximum accessibility to the manifold pipes during the time of their connection, as by sweat joints using copper elbow or nipple fittings.

Other objects and advantages of the invention will become apparent during the following discussion of the drawings.

THE DRAWINGS

Figures 1, 2, 3:
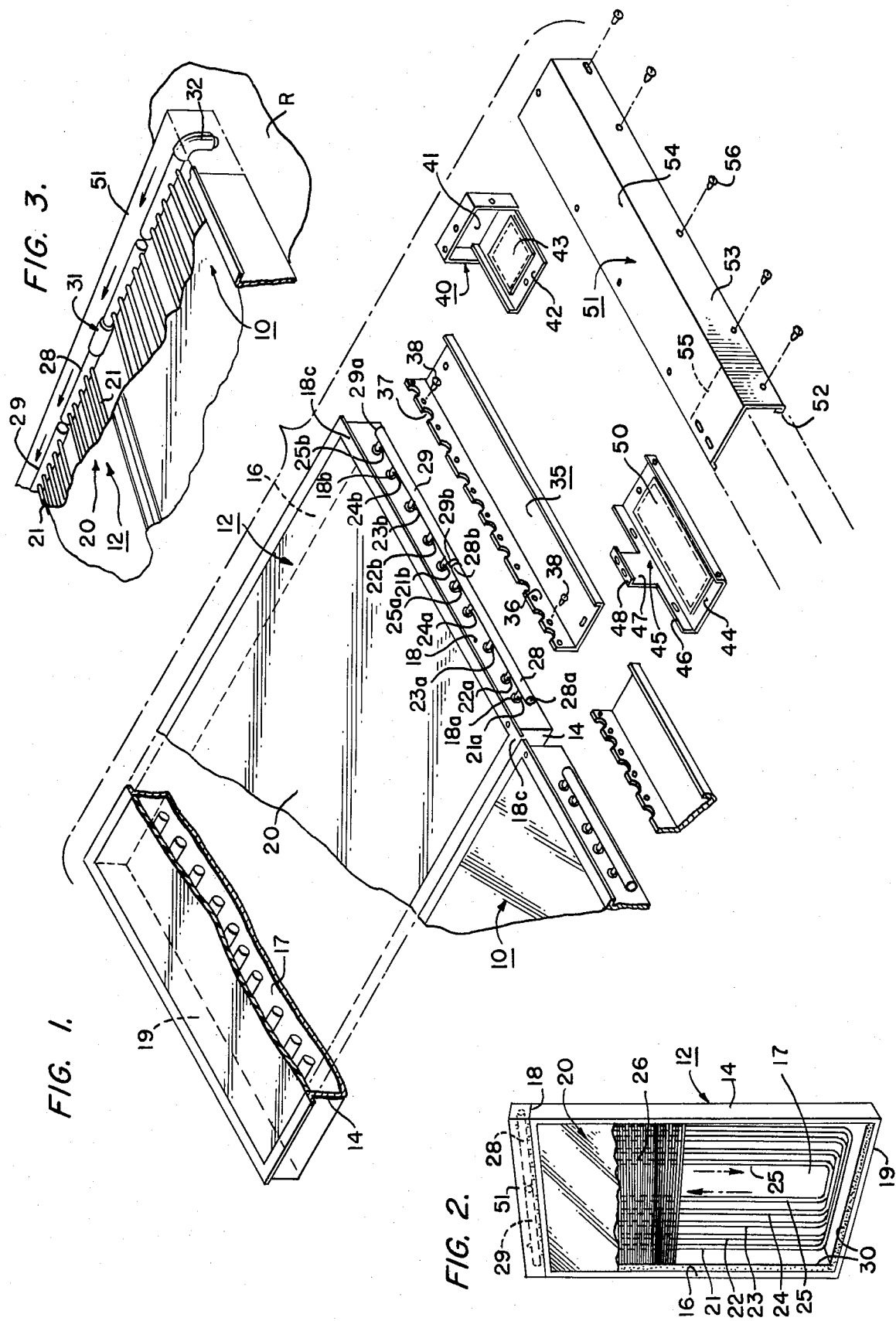
FIG. 1 is a fragmentary exploded view partly in cross-section showing two solar collector box units side-by-side, and showing appropriate cover members for covering the connections at the ends of the boxes.
FIG. 2 is a perspective view of a solar collector box partially broken away to show the tubes, insulation and fins within the box.
FIG. 3 is a partial perspective view with some of the box structure omitted to more clearly show interconnections between adjacent solar collector boxes and to fluid circuitry piping located beneath the roof on which they are supported.

Referring now particularly to FIG. 1, this view shows two partially broken away solar collector boxes 10 and 12 located side-by-side with no gaps between the boxes. The boxes are identical, and therefore, only the box 12 will be described in detail. The box 12 has upstanding side portions 14 and 16 and a first end portion 18 and a second end portion 19. The top area of the collector box 12 is covered by suitable glazing 20 which can also be seen in the other figures. The glazing can either be single or double glazing, and can be either glass or plastic, all as well known in the pripr art. The bottom 17 of the collector box is enclosed in sheet metal, and preferably the bottom 17 and the sides 14 and 16, and the end portions 18 and 19 are all in one piece.

Within the collector boxes such as the boxes 10 and 12 are located a plurality of collector tubes such as the tubes 21, 22, 23, 24, and 25 as shown in FIG. 2. These tubes are U-shaped, having a closed loop which extends across the second end portion 19 of the box 12, and then the tubes extend back up toward the first end portion 18 of the box. The tubes have inlet ends such as the ends 21a, 22a, 23a, 24a, and 25a in FIG. 2, and the tubes likewise have outlet ends 21b, 22b, 23b, 24b, and 25b. The inlet ends of the tubes extend through the first end portion 18 at entrance holes of which the hole 18a is typical, FIG. 2. Likewise, the outlet ends of the tubes extend through the first end portion 18 by way of exit holes such as the hole 18b.

All of the inlet ends of the tubes 21 through 25 are coupled into a manifold pipe 28 comprising the inlet manifold, and the outlet ends of all of the tubes 21 through 25 are coupled into an outlet manifold pipe 29. The inlet manifold pipe 28 has a bore therethrough labelled 28a, and the other end of the inlet manifold pipe at 28b is plugged. Likewise, the manifold pipe has an open bore 29a accessible at its far end, whereas, the near end 29b of the outlet manifold pipe 29 is plugged. The bores of the two manifold pipes extend oppositely and are mutually aligned, and the open ends adjacent the reference characters 29a and 28a stop transversely short of the side portions 14 and 16 of the collector box.

The tubes 21 through 25 are fitted with fins 26 in a manner well known in the prior art, and the inside of the collector box is covered with suitable insulation material 30 which serves to thermally insulate the tubes to prevent loss of heat through the box to the surrounding atmosphere as well known in the prior art. The tubes 21 through 25 and the manifolds 28 and 29 are copper, and the manifolds on adjacent collector boxes can be mutually connected together by suitable nipples as shown at 31 in FIG. 3, the outlet manifold pipe on one collector box being joined by a sweat connection and nipple 31 to the inlet manifold pipe on the next adjacent collector box. The end boxes are connected downwardly through a roof R or other supporting surface using an elbow 32 to connect the first inlet manifold pipe and the last outlet manifold pipe in the array to fluid circuit heating system pipes within the building (not shown).

When the manifold pipes have thus been interconnected with each other and coupled to piping within the building, the ends of the collector boxes adjacent to the manifold pipes at the first end portion 18 of the box are then enclosed and protected by suitable covers having multiple separable members. These separable cover members are shown in FIG. 1 and comprise a bottom member 35 having an upstanding flange 36 with notches 37 fitting around the ends of the tubes 21 through 25. The flange 36 is screwed to the first end portion panel 18 by suitable sheet member screws such as the screws 38. It will be noted that the bottom member 35 is shorter in length than the end portion 18 of the collector box, and therefore additional end members are provided to complete the cover. There are two types of such end members, the first type being shown at 40 which is a closure member having a closed end panel 41 with flanges therearound and sheet-metal screw holes, and having a bottom panel 42 which has a cut-out shown in dashed lines covered by a neoprene insert 43 which is easily cut away to pass a pipe into the building when an elbow such as the elbow 32 is attached to the adjacent manifold pipe.

Alternatively, there is another type of end member which is an intermediate coupling member 45 used when two adjacent collector boxes are to be joined side-by-side using a nipple such as the nipple 31 in FIG. 3. This end member 45 has an upstanding flange 46 having a high central portion 47 and a top flange 48 underlying the flanges of the collector boxes such as the flange 18c shown in FIG. 2. The member 45 has a bottom panel 44 having a rectangular hole therethrough which is likewise covered by neoprene 50 which can be punctured in the event that pipes are to be passed downwardly through the roof which supports the solar collector boxes. If the neoprene panel 50 is not punctured, then the bottom members 35 and 45 together will form a continuous bottom member passing adjacent to and between the solar boxes.

Finally, each box is provided with a top member 51 which mates with the composite bottom members and has a flange 52 which extends therebeneath, an end panel 53 and a top surface panel 54, which panels completely enclose the manifold pipes and conceal them, as well as protecting them from weather and from loss of heat. These top members 51 are made longer than the first end portion 18 of the box so that there is an overlap as shown in dotted lines at 55 in FIG. 1. Again, suitable sheet metal screws 56 are used to secure the panels together, the multiple screw holes being shown in the various panels for this purpose.

This invention is not to be limited to the exact form shown in the drawings for obviously changes may be made therein within the scope of the following claims.

I claim:

1. Solar heat collector apparatus having multiple solar collector panels made in the form of identical modular units for connection with external fluid circuitry, each modular unit comprising:

(a) a closed collector box having a closed bottom and upstanding sides and having first and second end portions, the first end portion having both entrance holes and exit holes extending therethrough and communicating between the outside and the inside of the box and the second end portion being fully closed;

(b) multiple collector tubes in the box, each tube having an entrance end entering the box through an entrance hole and an exit end leaving the box through an exit hole in the same end portion, the entrance holes being located on the opposite side of the center of the first end portion from the exit holes and the holes all being mutually aligned parallel to the plane of the bottom of the box;

(c) separate inlet and outlet manifold pipes having their bores mutually aligned along a common axis and disposed parallel to the bottom of the box and extending across the first end portion at the level of said holes, their bores being sealed and out of mutual communication and the pipes being spaced apart where they approach the center of the first end panel, and the entrance ends and exit ends of the collector tubes being respectively connected into the separate inlet and outlet manifold pipes;

(d) the inlet and outlet manifold pipes each having one end for attachment to said external fluid circuitry, and said open ends extending along said axis and facing in opposite directions and terminating short of the sides of the box;

(e) a cover attached to the first end portion of the collector box and enclosing said manifold pipes, the cover comprising multiple separable cover members including a bottom cover member underlying the manifold pipes in the plane of the bottom of the collector box and having a flange attached to said first end portion of the box, and including a top cover member overlying the manifold pipes and lying parallel to the bottom cover member and having a panel member joining said bottom cover member and lying parallel to the first end portion of the box; and (f) said multiple modular collector units being disposed side-by-side with their adjacent manifold pipes connected together, and their covers further including an intermediate cover member which is common to the adjacent units and coupled with the top and bottom cover members of both units.

2. The solar heat collector apparatus as claimed in claim 1, wherein the portions of the collector tubes located inside the collector box are finned and the box is lined with insulation material and has glazing covering one surface through which the tubes are exposed to solar energy, and said cover members which are not adjacent to similar modular units including end members completely enclosing the portions of the collector tubes which are outside of the collector box and the associated manifold pipes.

3. The solar heat collector apparatus as claimed in claim 2, wherein each of said members includes an end panel for enclosing the corresponding end of the cover, the end panel lying substantially in the plane of the adjacent side of the collector box and the end member having flange portions mating with the top and bottom cover members.

4. The solar heat collector apparatus as claimed in claim 2, wherein the end members are made of sheet material and have panels which have cut-outs to pass connections to said external fluid circuitry, and the panels having neoprene sheets covering the cut-outs, the sheets being perforable to pass said connections.

* * * * *